(12) United States Patent
Misawa

(10) Patent No.: US 7,298,409 B1
(45) Date of Patent: Nov. 20, 2007

(54) IMAGING SYSTEM

(75) Inventor: Takeshi Misawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 789 days.

(21) Appl. No.: 09/630,659

(22) Filed: Aug. 1, 2000

(30) Foreign Application Priority Data

Aug. 2, 1999 (JP) ................................ 11-218406

(51) Int. Cl.
  *H04N 5/222* (2006.01)
(52) U.S. Cl. .............................. 348/333.01; 348/333.02
(58) Field of Classification Search .......... 348/333.01, 348/333.02, 333.05, 333.11, 333.12, 207.99; 345/530, 531, 547; 715/853, 854, 855, 791
See application file for complete search history.

(56) References Cited

U.S. PATENT DOCUMENTS

| | | | | |
|---|---|---|---|---|
| 5,191,441 A | * | 3/1993 | Suzuki et al. ................ | 358/451 |
| 5,253,338 A | * | 10/1993 | Tanaka ......................... | 345/629 |
| 5,589,960 A | * | 12/1996 | Chiba et al. ................... | 349/76 |
| 5,754,230 A | * | 5/1998 | Tsuruta ................... | 348/333.12 |
| 6,091,450 A | * | 7/2000 | Hirasawa ................ | 348/333.01 |
| 6,496,208 B1 | * | 12/2002 | Bernhardt et al. ........... | 715/853 |
| 6,567,120 B1 | * | 5/2003 | Hamamura et al. .... | 348/207.99 |
| 6,657,667 B1 | * | 12/2003 | Anderson .............. | 348/333.12 |
| 2002/0024608 A1 | * | 2/2002 | Ejima et al. ........... | 348/333.05 |

FOREIGN PATENT DOCUMENTS

| | | |
|---|---|---|
| EP | 0 737 005 A1 | 10/1996 |
| JP | 05-145818 | 6/1993 |
| JP | 05-260352 | 10/1993 |
| JP | 05-337077 | 12/1993 |
| JP | 29285 | 4/1994 |
| JP | 9-270942 A | 10/1997 |
| JP | 10-322684 A | 12/1998 |
| JP | 11-088767 | 3/1999 |
| JP | 11-103436 | 4/1999 |

* cited by examiner

*Primary Examiner*—Luong T. Nguyen
(74) *Attorney, Agent, or Firm*—Birch, Stewart, Kolasch & Birch, LLP

(57) ABSTRACT

When a portion of an image is displayed, a range of the image which is being displayed can be easily recognized. Namely, when enlarged image data which corresponds to an enlarged display range shown by hatching is extracted from image data and displayed on a display, a portion of the image which is represented by the enlarged image data is displayed on the entire display surface of the display. Original image data is processed such that a frame which represents the enlarged display range is synthesized with the image represented by the original image data, and resultant image data is displayed, as a navigation image, in an upper right corner of the display surface of the display.

36 Claims, 17 Drawing Sheets

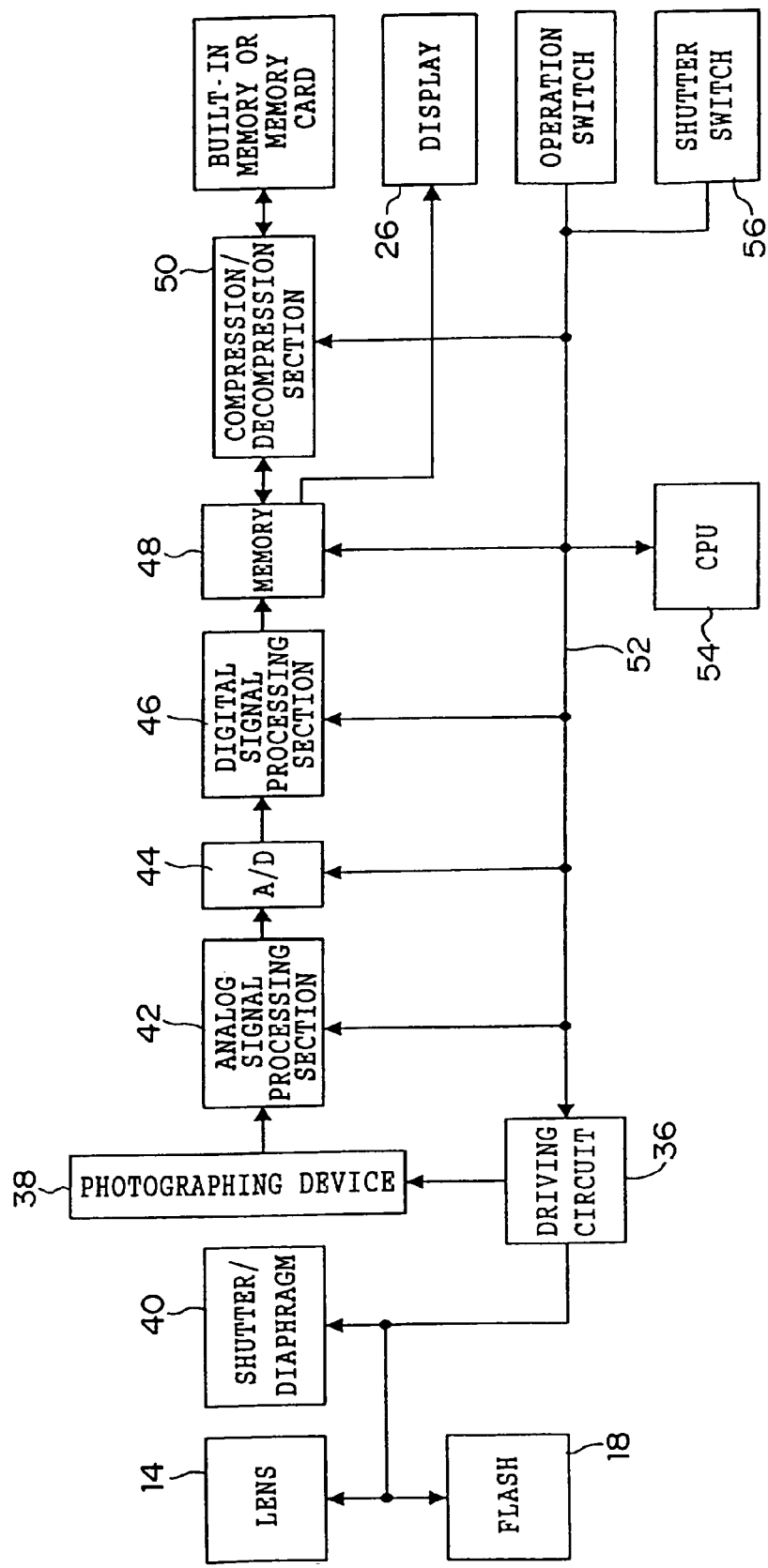
F I G. 2

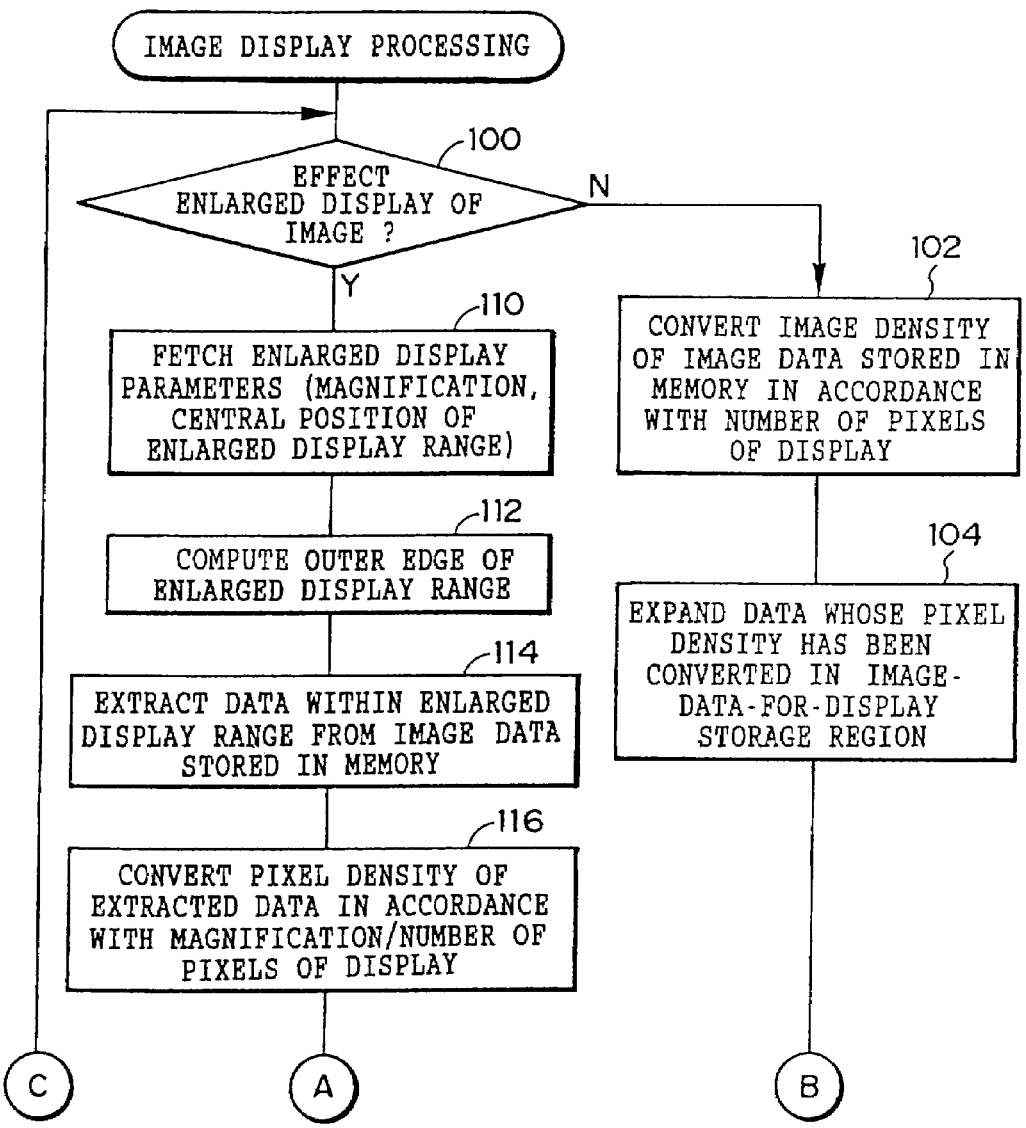

F I G. 5
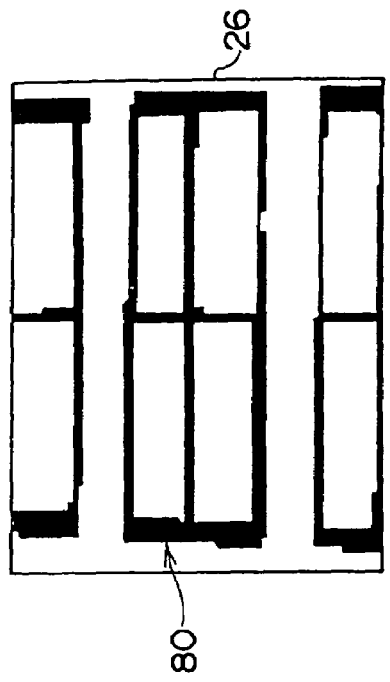
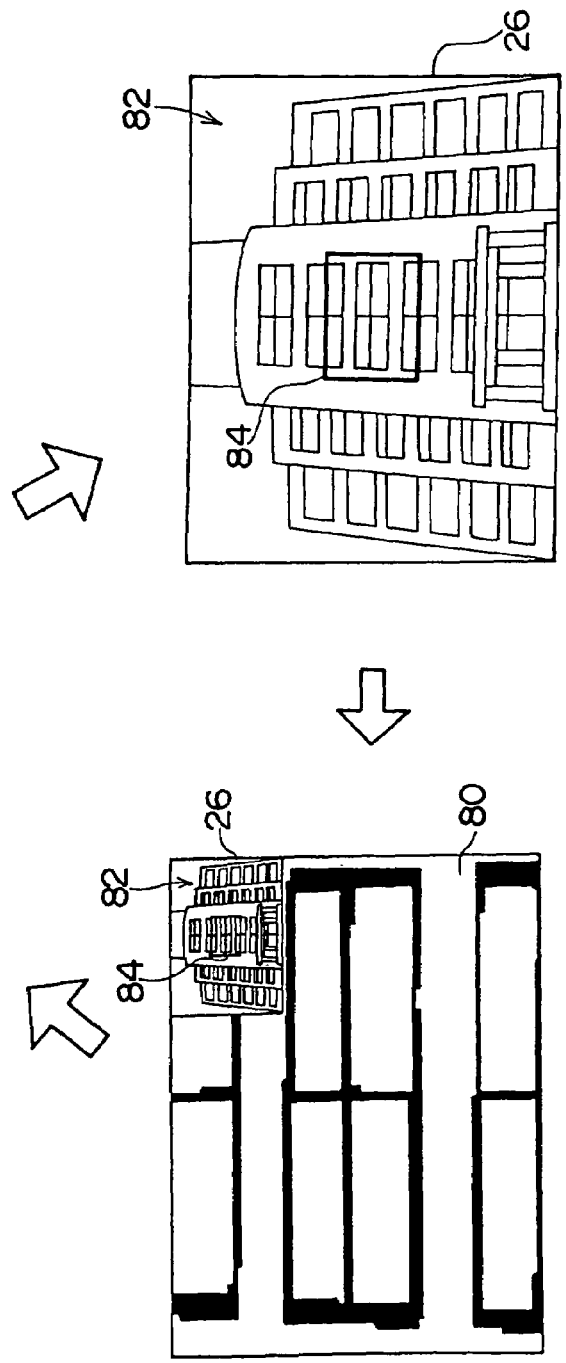

EXPOSURE:1/125, F8
EXPOSURE CORRECTION: NONE

F I G. 1 1 A
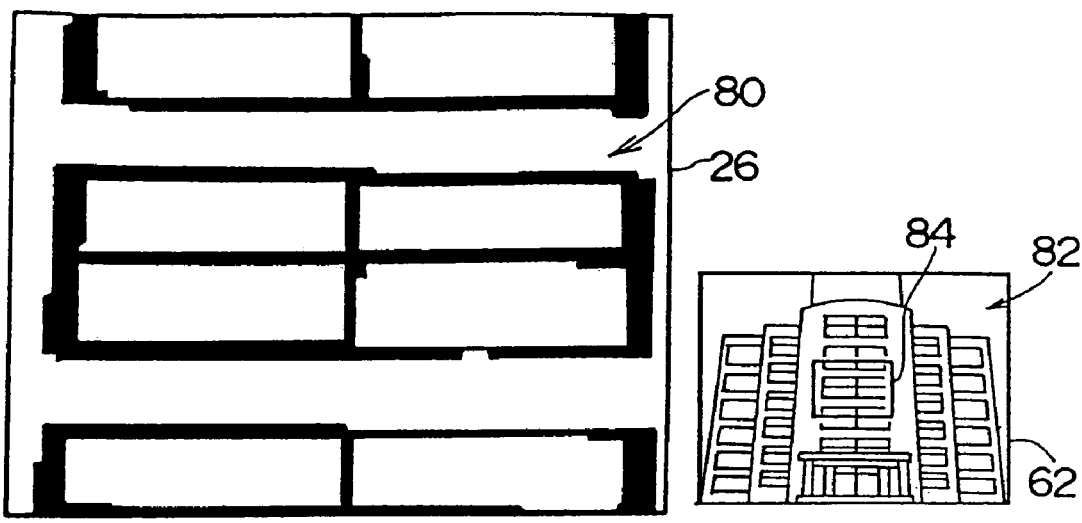
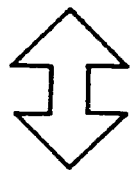 SWITCHING OF DISPLAY
F I G. 1 1 B
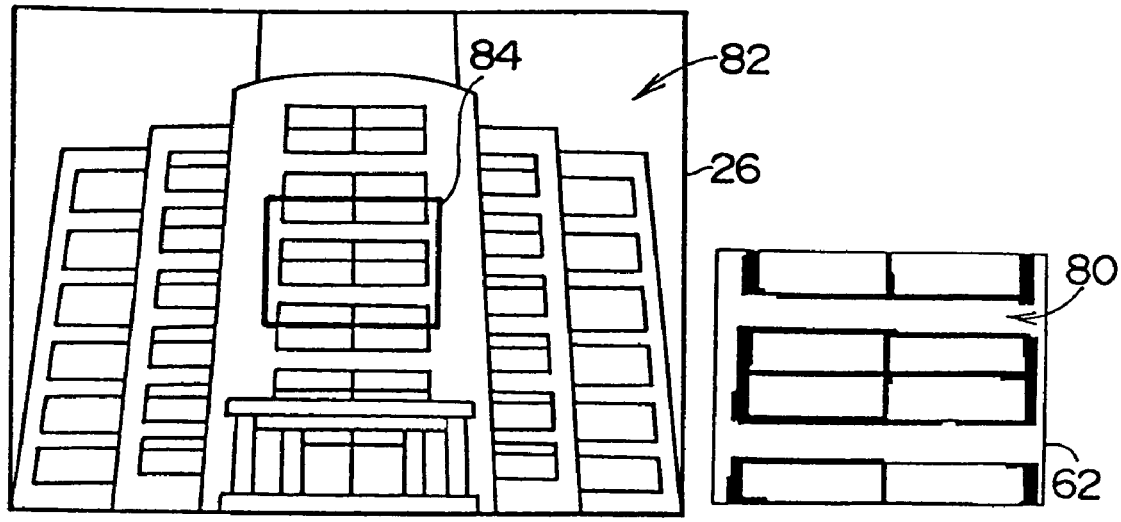

IMAGING SYSTEM

BACKGROUND OF THE INVENTION

1. Field of the Invention

The present invention relates to an image display apparatus and an image photographing apparatus, and in particular, to an image display apparatus which displays an image represented by image information on a display device, and an image photographing apparatus which includes the image display apparatus.

2. Description of the Related Art

In general, an image photographing apparatus such as a digital still camera, a digital video camera, or the like is provided with a display device which is formed by an LCD or the like in order to enable confirmation of a photographed image or a played-back image at a time of photographing or playing back an image. Among various image photographing apparatuses, some apparatuses have a function in which the photographed image or the played-back image which is displayed on the display device can be displayed in an enlarged manner in accordance with a designation from a user. This function is effective, for example, in a case of confirming the focus or exposure at the time the image was photographed.

Japanese Patent Application Laid-Open (JP-A) No. 6-153071 discloses, in relation to the above-described art, an image signal processing mechanism in which image processing such as enlargement/reduction, rotation, or the like of an image can be easily carried out when the stored image data is played back.

Here, in the image photographing apparatus, the resolution of the photographed image (the number of pixels of the image data obtained by photographing) is an important factor which relates to the image quality of the photographed image, and technology is advancing at a pace such that resolution becomes higher year by year. Accordingly, there arises a problem that when the photographed image or the played-back image which is displayed on the display device is displayed in an enlarged manner, it is difficult to know which portion of the original image is being displayed in an enlarged manner. Especially, when the original image is an image obtained by photographing a scene in which the same type of objects are aligned in succession, or the like, it is difficult to determine which portion of the original image is being displayed in an enlarged manner.

The above-described problem is not limited to image photographing apparatuses. In an apparatus which has functions of displaying an image on a display device and of displaying the displayed image in an enlarged manner (e.g., an apparatus which has a function of simply playing back an image), for example, when the surface area of a display surface of the display device is small and a display range when an image is displayed in an enlarged manner is limited, it is difficult to judge which portion of the image is being displayed in an enlarged manner.

SUMMARY OF THE INVENTION

The present invention has been developed in view of the aforementioned facts, and an object of the present invention is to provide an image display apparatus and an image photographing apparatus in which in a case of displaying a portion of an image, the range of the image which range is being displayed can be easily recognized.

In order to accomplish the above-mentioned object, a first aspect of a first invention is an image display apparatus, comprising: (a) a memory device having circuitry disposed therein for electronic storage and retrieval of information; (b) a display device having a display panel and circuitry for electronically displaying information on the panel; and (c) a display control device electronically connected to the memory device and the display control device, the display control device having electronic program logic, which when information is stored in the memory device representing an image, is operable for causing the display control device to retrieve the stored information and display a portion of the image represented by the stored information as a main image on the display device panel and range information indicating the portion of the image displayed in relation to the entire image represented by the stored information.

The first aspect of the first invention includes the memory device which stores image information and the display device for displaying the image. The memory device may be formed by, for example, a RAM or the like. The image information may be, as recited in the sixth aspect of the first invention, for example, image information which is read out from an information storage medium, or may be image information which is outputted from a photographing device which converts an optical image to image information, or may be image information which is obtained by communication with another devices. The display device may be a transmission type dot matrix display as in the second aspect, or may be a reflection type dot matrix display, or may be another displays. Specifically, the display device may be structured by an LCD display, a CRT display, a plasma display, or the like.

When a portion of an image represented by the image information stored in the memory device is displayed on the display device as a main image, the display control device of the first aspect also displays visible information which represents a range, of the image represented by the image information, which range is being displayed as the main image. Accordingly, a user can easily visually recognize the range (specifically, the position, the shape, and the size of the range of the image) which is being displayed as the main image by viewing the displayed visible information. Therefore, according to the first aspect of the present invention, it is possible to easily recognize the displayed range, within the entire image, when a portion of the image is being displayed.

A third aspect of the first invention is the image display apparatus of the first aspect of the first invention, wherein the range information comprises a sub-image on the display device panel of the entire image, superposed over a section of the main image.

In the third aspect of the first invention, a sub-image, whose display range is the entire image represented by the image information and in which the range which is being displayed as the main image is designated, can be displayed as the visible information at a smaller display magnification than that of the main image. Therefore, when the user views the displayed sub-image, the user can easily recognize not only the range of the image which is being displayed as the main image, but also the entire image represented by the image information. As a result, for example, in an aspect such as a fifth aspect of the present invention which will be described later and in which a size or a position of the range which is to be displayed as the main image can be changed by the user, the user can easily decide the range of the image which is to be displayed as the main image.

In the third aspect of the first invention, the range which is being displayed as the main image can be designated on the sub image by, for example, displaying, as the sub-image, an image on which a graphic form which represents a boundary between the range which is being displayed as the main image and a range other than the range which is being displayed as the main image is superposed, or displaying, as the sub-image, an image in which at least one of saturation, lightness, and hue of the range which is being displayed as the main image is different from that of the range other than the range which is being displayed as the main image.

Display of the main image and the sub-image may be, as in a fourth aspect of the present invention carried out by displaying the main image and the sub-image on a single display device, or, if a plurality of display devices are provided, by separately displaying the main image and the sub-image on the plural display devices. When the main image and the sub-image are displayed on the single display device, it is not necessary to add a new display device to display the sub-image, and therefore, manufacturing costs do not increase. When the main image and the sub-image are separately displayed on the plural display devices, there is no need to limit a display area of the main image in order to display the sub-image.

A fifth aspect of the first invention is the image display apparatus of the first aspect of the first invention, further comprising a designation device electronically connected to the display control device, the designation device being for selecting at least one of a position designating the portion of the image to be displayed, and a magnification size, wherein the electronic program logic determines the range information in accordance with a selection inputted via the designation device.

In the fifth aspect of the first invention, if the user designates via the designating device at least one of the size and the position of the range which is to be displayed as the main image, at least one of the size and the position of the range which is to be displayed as the main image is changed. Accordingly, it is possible to display, as the main image, any range of the image represented by the image information. Therefore, it is possible to easily confirm or view any portion of the image represented by the image information.

A sixth aspect of the first invention is the image display apparatus of the first aspect of the first invention, wherein the stored information was read from an information storage medium and stored in the memory device. In the sixth aspect of the first invention, because an image represented by image information which is read out from an information storage medium is displayed on the display device, a portion of the image represented by the image information stored in the information storage medium can be easily confirmed or viewed.

An image photographing device of a first aspect of a second invention includes a photographing device which converts an optical image to image information, and the above-described image display apparatus. The display control device displays on the display device an image represented by image information which is outputted from the photographing device and stored in a memory device, or an image represented by image information which is read out from an information storage medium and stored in the memory device.

The first aspect of the second invention includes the photographing device which converts an optical image to image information, and the above-described image display apparatus. The display control device relating to the first aspect of the second invention displays on the display device an image (a photographed image) represented by image information which is outputted from the photographing device and stored in the memory device, or an image (a played-back image) represented by image information which is read out from the information storage medium and stored in the memory device. Accordingly, in accordance with the first aspect of the second invention, when a portion of the photographed image or the played back image is displayed, as in the first aspect of the first invention, it is possible to easily recognize the range within the entire image, which range is being displayed.

A second aspect of the second invention is an apparatus for photographic imagery of the first aspect of the first invention, further comprising an optical finder for viewing an optical image for conversion by said photography device to electronic image information representative of the optical image, wherein the display device includes another display panel and when the stored information has been outputted from the photography device into the memory device, the electronic program logic displays as main image the entire image represented by the stored information, and a portion of the entire image, the another display panel with the range information being indicated as a differential portion of the main image.

In the second aspect of the second invention, the optical finder for visually confirming the optical image which is converted to image information by the photographing device is provided. An image which represents the range which is being displayed as the main image is displayed as visible information in a superposed manner on the image which is being viewed via the optical finder. As described above, displaying the image, which represents the range which is being displayed as the main image, in a superposed manner on the image which is being viewed via the optical finder, can be realized as follows. An optical element, whose light transmittance can be partially changed such as an LCD or the like, is disposed on the optical finder. An image in which the light transmittance of the range of the main image is different from that of the range other than the range of the main image (a light transmittance pattern), or an image in which the light transmittance of the boundary between the range of the main image and the range other than the range of the main image is different from that of other portions (a light transmittance pattern), is displayed on the LCD as the image which represents the range which is being displayed as the main image.

In the second aspect of the second invention, an image which is being viewed at via the optical finder is used, and an image which serves as visible information is superposed on the image which is being viewed at via the optical finder. Therefore, the range which is being displayed as the main image is visually displayed. Accordingly, it is possible to grasp the overall image represented by the image information without, for example, providing a new display device for displaying the sub-image or without limiting the display area of the main image by displaying the main image and the sub-image on the same display device.

BRIEF DESCRIPTION OF THE DRAWINGS

FIG. 2 is a block diagram which shows a schematic structure of an electric system of the digital still camera shown in FIGS. 1A and 1B.

FIGS. 3A and 3B are flowcharts which show contents of an image display processing.

FIG. 5 is an imaginary view of an example in which a displayed image is switched in accordance with a designation for switching a display mode.

FIGS. 11A and 11B are imaginary views of an example in which an enlarged image is displayed on a main display and a navigation image is displayed on a sub display.

DESCRIPTION OF THE PREFERRED EMBODIMENTS

Embodiments of the present invention will be explained in detail hereinafter with reference to the drawings.

First Embodiment

FIG. 1 shows a digital still camera 10 relating to a first embodiment. The digital still camera 10 has, as described later, a function as an image display apparatus recited in the first aspect of the first invention and the like, and corresponds to an image photographing apparatus recited in the first aspect of the second invention.

Figure 1A:
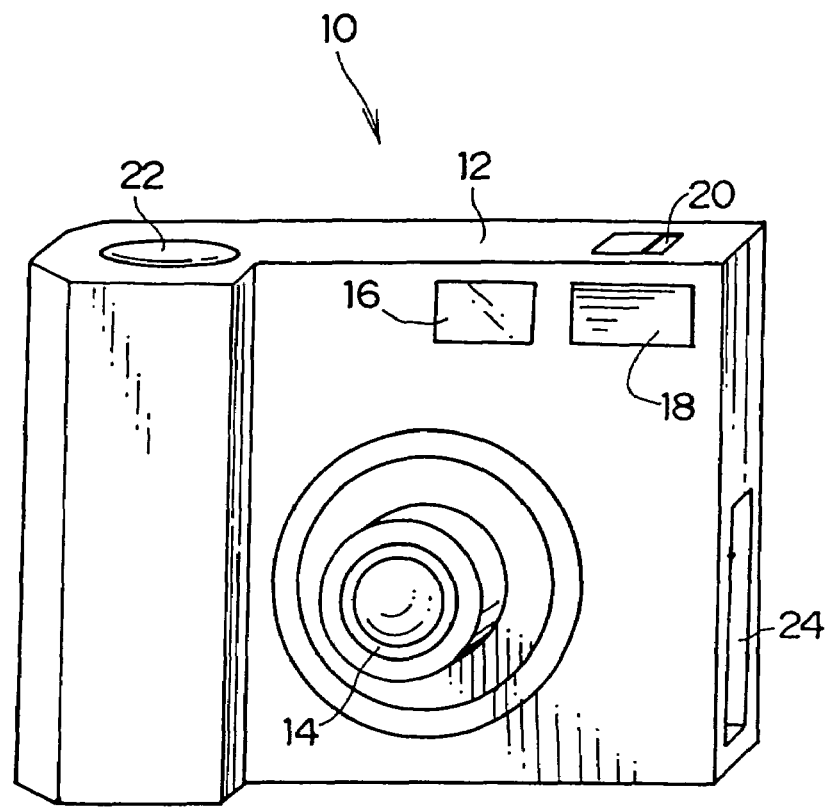
FIG. 1A is a perspective view of a digital still camera of a first embodiment seen from the front.

As illustrated in FIG. 1, a main body 12 of the digital still camera 10 is formed in a substantial box shape, and a protrusion (grip portion) for easy grip of the main body 12 is formed at the left side of the main body 12, seen from the front. As illustrated in FIG. 1A, a lens 14 is mounted at a center of the front surface of the main body 12. An optical finder 16 for a user to visually confirm a range to be photographed or the like, and a flash 18 for emitting auxiliary light when an image is photographed at a low illumination level or the like, are mounted above the lens 14 of the main body 12.

A power switch 20 is provided at the right side, seen from the front, of the top surface of the main body 12 and a shutter button 22 is provided at the left side (a position which corresponds to the grip portion), seen from the front, of the top surface of the main body 12. A slot 24, into which a memory card (not shown) which serves as an information storage medium can be loaded, is provided at the right side surface of the main body 12, seen from the front.

Figure 1B:
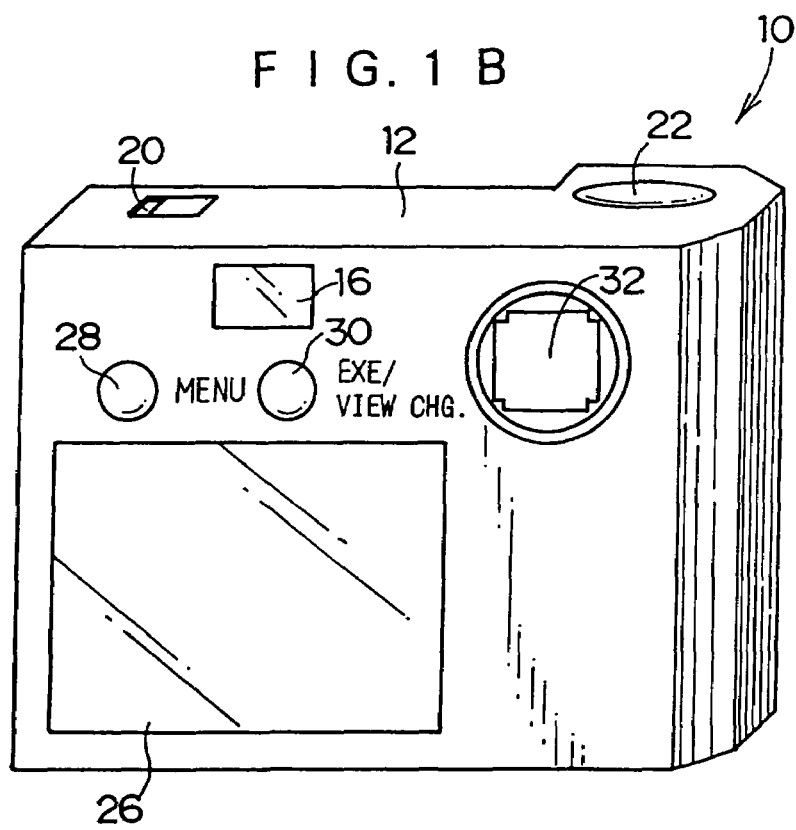
FIG. 1B is a perspective view of the digital still camera of the first embodiment, seen from the back.

As illustrated in FIG. 1B, a color display 26 (which may be a monochrome display), which is formed by a reflection type display device or a transmission type display device (for example, an LCD), is mounted at a lower side of the back surface of the main body 12. A menu switch 28, an execution/view changing switch 30, and an operation switch 32 are respectively mounted above the display 26.

FIG. 2 shows a structure of an electric system of the digital still camera 10. The lens 14 is specifically a zoom lens (a focal distance varying lens) having an automatic focusing (AF) mechanism. The AF mechanism and the zoom mechanism of the lens 14 are driven by a driving circuit 36. Instead of the zoom lens, a focal distance fixing lens having only the AF mechanism may be used as the lens 14.

A photographing device 38 which is structured by an area CCD sensor or the like is disposed at a position corresponding to a focal position of the lens 14 within the main body 12. Light, which is reflected by a subject and made incident on the lens 14, is imaged on a light receiving surface of the photographing device 38. The photographing device 38 is driven at a timing which is synchronized with a timing signal generated by a timing generation circuit (not shown) which is included in the driving circuit 36, and outputs an image signal (a signal which represents an amount of light received in respective plural photoelectric conversion cells arranged in a matrix on the light receiving surface).

A shutter/diaphragm 40 is disposed between the lens 14 and the photographing device 38. The shutter/diaphragm is driven by the driving circuit 36. The shutter is designed to prevent smear from being generated due to the incidence of light on the light receiving surface of the photographing device 38 when the image signal is outputted from the photographing device 38. The shutter may be omitted depending on the structure of the photographing device 38. The diaphragm may be structured by a single diaphragm which can continuously change a setting of the diaphragm, or may be structured such that a plurality of diaphragms, each of whose setting is different, are switched. The flash 18 is also connected to the driving circuit 36. The flash 18 is made to emit light by the driving circuit 36 when a low illumination level is detected, or made to emit light by the driving circuit 36 when emission is designated by a user.

Connected to a signal output terminal of the photographing device 38 are an analog signal processing section 42, an A/D converter 44, a digital signal processing section 46, and a memory 48 in that order. The analog signal processing section 42 amplifies an image signal outputted from the photographing device 38 and carries out corrections of white balance or the like upon the amplified image signal. The image signal which is outputted from the analog signal processing section 42 is converted to digital image data by the A/D converter 44 and the digital image data is inputted to the digital signal processing section 46. In the digital signal processing section 46, various processings such as color correction, γ correction, Y/C conversion and the like are carried out upon the inputted image data. The image data outputted from the digital signal processing section 46 is temporarily stored in a memory 48 formed by a RAM or the like.

The memory 48 corresponds to a memory device of the present invention. The image data stored in the memory 48 corresponds to image information relating to the present invention. The lens 14, the photographing device 38, the analog signal processing section 42, the A/D converter 44, and the digital signal processing section 46 correspond to a photographing device of the present invention.

The driving circuit 36, the analog signal processing section 42, the A/D converter 44, the digital signal processing section 46, the memory 48 and, a compression and decompression section 50 (to be described later) are connected to a bus 52. A CPU 54 is connected to the bus 52. Switches (which are referred to as "operation switches" in FIG. 2) such as the power switch 20, the menu switch 28, the execution/view changing switch 30, the operation switch 32 and the like, and a shutter switch 56 which is turned on and off by operating the shutter button 22 are also respectively connected to the bus 52. The CPU 54 includes a peripheral circuit (not shown) such as a ROM, a RAM, an input/output port or the like.

The display 26 and the compression and decompression section 50 are respectively connected to the memory 48. When an image is to be displayed on the display 26, the CPU 54 carries out image display processing, which will be described later, upon the image data which is temporarily stored in the memory 48, and then transmits the image data to the display 26. As a result, the image which is represented by the image data which is temporarily stored in the memory 48 is displayed on the display 26.

When storage of the image data to the memory card which is loaded into the slot 24 is designated by operating the shutter button 22 so as to turn on the shutter switch 56, the CPU 54 reads out the image data which is temporarily stored in the memory 48 and transmits the image data to the compression and decompression section 50. Then, the image data is compressed at the compression and decompression section 50 and then the resultant image data is stored in the memory card. There may be cases in which the image data is stored in the memory card without being compressed depending on a photographing mode or the like.

When playback (display) of the image represented by the image data which is stored in the memory card which is loaded into the slot 24 is designated, the image data is read out from the memory card. When the read-out image data is compressed and stored, the compressed image data is decompressed at the compression and decompression section 50 and then the resultant image data is temporarily stored in the memory 48. Then, the image is displayed (played back) on the display 26 by using the image data which is temporarily stored in the memory 48.

Figure 3B:
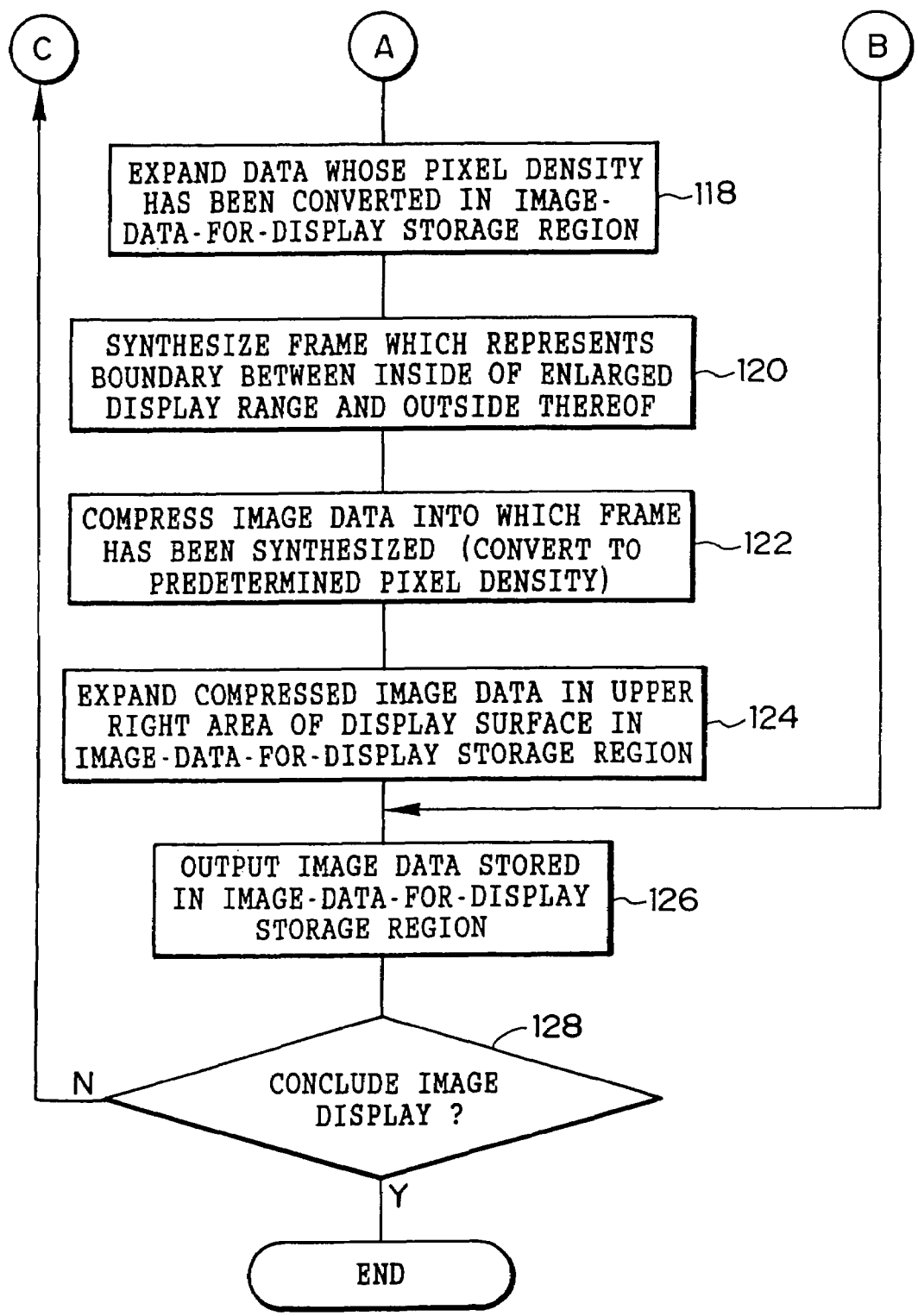

As an operation of the present embodiment, image display processing will be explained with reference to the flowcharts in FIGS. 3A and 3B. This image display processing is carried out in the CPU 54 when displaying an image on the display 26 in the photographing mode is designated, or when the image play-back mode is selected, in which the image represented by the image data which is stored in the memory card is displayed on the display 26. This image display processing is carried out in a state in which image data obtained by photographing with the photographing device 38 or image data which is read out from the memory card is stored in the memory 48.

In step 100, a determination is made as to whether or not to display an image in an enlarged manner by an electronic magnification-changing processing. If displaying the image in an enlarged manner by the electronic changing magnification is not to be carried out (if the entire image represented by image data which is stored in the memory 48 is to be displayed on the display 26), the process proceeds to step 102. In step 102, the pixel density of the image data which is stored in the memory 48 is converted on the basis of the number of pixels of the display 26 (i.e., the pixel density is converted such that the number of pixels of the image represented by the image data in vertical and horizontal directions coincides with the number of pixels of the display 26 in the vertical and horizontal directions).

In next step 104, the image data, whose pixel density has been converted, is expanded in an image-data-for-display storage region (bit map memory) which is provided in the memory 48 in advance. Then, the process proceeds to step 126. In step 126, the image data which is stored in the image-data-for-display storage region is transmitted to the display 26. Accordingly, the entire image represented by the image data which is stored in the memory 48 is displayed on the entire display 26. In step 128, a determination is made as to whether displaying of the image is finished. If the answer to the determination in step 128 is "No", the process returns to step 100 and steps after step 100 are repeated.

The operation switch 32 which is provided at the back surface of the main body 12 of the digital still camera 10 is provided with switches corresponding to upper, lower, right and left end portions of a substantially square button. When an end portion of the button is pressed, a corresponding switch is turned on. In the image photographing mode, the operation switch 32 is used to designate to switching of the zoom magnification. When the zoom magnification is to be increased, the upper switch is turned on, and when the zoom magnification is to be reduced, the lower switch is turned on.

In accordance with turning on or off the upper or lower switch of the operation switch 32, the CPU 54 changes the optical magnification of the optical finder 16 as well as the optical magnification (focal distance) of the lens 14. If an image is being displayed on the display 26, an image corresponding to the optical magnification of the lens 14 is displayed on the display 26. In the image photographing mode, the image data which is stored in the memory 48 is periodically updated by the image signal which is periodically outputted from the photographing device 38. While the zoom magnification is switched only by changing the optical magnification of the lens 14, as described above, the answer to the determination in step 100 is not affirmative. Accordingly, the entire image represented by the image data which is stored in the memory 48 is always displayed on the entire display 26.

In the image photographing mode, when increasing the zoom magnification is further designated via the operation switch 32 when the optical magnification of the lens 14 is maximized, if an image is being displayed on the display 26, it is determined that displaying an image in an enlarged manner needs to be carried out by the electronic changing magnification processing. Then, the answer to the determination in step 100 is affirmative. In the electronic changing magnification processing in the image photographing mode, the central position of an enlarged display range always coincides with the central position of an original image.

On the other hand, in the image play back mode, the operation switch 32 is used to designate switching of the image display magnification and moving of the image display range. That is to say, when the upper or lower switch is simply turned on or off, it means that changing the image display magnification is designated. When the image display magnification is to be increased, the upper switch is turned on, and when the image display magnification is to be reduced, the lower switch is turned on. When any one of the upper, lower, right, or left switches is turned on or off in a state that a button (not shown) is being pressed, it means that changing the image display range is designated. Then, a switch corresponding to a direction in which the image display range is to be moved is turned on in a state that the unillustrated button is being pressed.

In the image play back mode, an initial value of the image display magnification is a magnification (i.e., a minimized magnification) at which the entire image represented by the image data is displayed on the entire display 26. When switching the image display magnification (i.e., displaying the image in an enlarged manner) is designated via the operation switch 32, and when moving the enlarged display range is designated via the operation switch 32, it is determined that the image needs to be displayed in an enlarged manner by the electronic changing magnification processing. Accordingly, the answer to the determination in step 100 is affirmative. In the electronic changing magnification processing in the image play back mode, the central position of the enlarged display range is set or changed in accordance with the designation for moving the enlarged display range.

If the answer to the determination in step 100 is affirmative as described above, the process proceeds to step 110. In step 110, enlarged display parameters (a magnification of an image and the central position of the enlarged display range) which are set or changed by operating the operation switch 32 are fetched. In step 112, on the basis of the fetched enlarged displayed parameters, a position which corresponds to the outer edge of the enlarged display range on the image represented by the image data stored in the memory 48 is computed. In step 114, on the basis of the result of the computation in step 112, data within the enlarged display range (enlarged image data) is extracted from the image data which is stored in the memory 48.

Figure 4A:
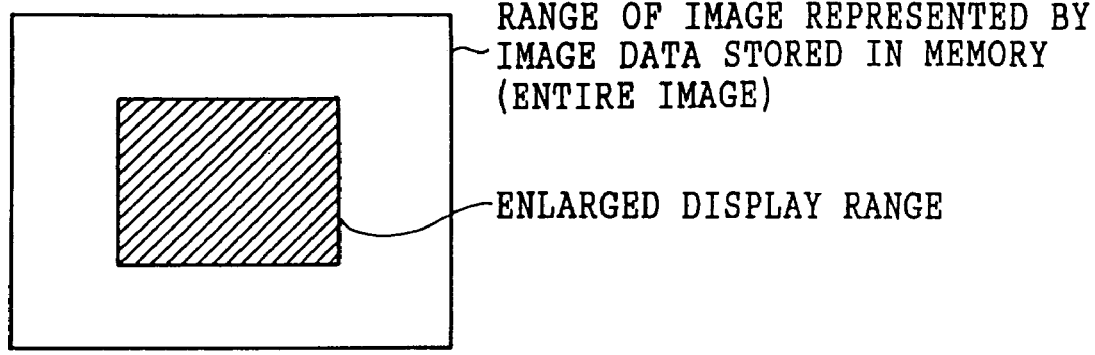
FIG. 4A is a concept view for explaining a processing carried out in a case of displaying a portion of an image in an enlarged manner.

For example, when a range (the outer edge) of the image represented by the image data which is stored in the memory 48 is represented by a white rectangle shown in FIG. 4A, and an enlarged display range is represented by a hatched rectangle shown in FIG. 4A, data within the range represented by the hatched rectangle is extracted as the enlarged image data. Determination of the enlarged display range in accordance with the operation of the operation switch 32 and extraction of the enlarged image data within the enlarged display range, as in steps 112 and 114, correspond to a display controller recited in the fifth aspect of the first invention. The operation switch 32 corresponds to a designating device recited in the fifth aspect of the first invention.

In step 116, the pixel density of the enlarged image data which has been extracted is converted on the basis of the magnification and the number of pixels of the display 26 (i.e., the pixel density of the enlarged image data which has been extracted is converted such that vertical direction and horizontal direction the numbers of pixels of the image represented by the enlarged image data which has been extracted coincide with the numbers of pixels of the display 26 in the vertical and horizontal directions). Then, in step 118, the enlarged image data, which has been subjected to pixel density conversion, is expanded in the image data-for-display storage region.

In next step 120, the original image data which is stored in the memory 48 is modified such that a frame which represents a boundary (the outer edge of the enlarged display range) between the inside of the enlarged display range and the outside thereof, is synthesized with the image represented by the original image data. In step 122, the pixel density of the image data is converted to a predetermined pixel density such that a frame size of the image with which the frame is synthesized and which is represented by the image data is reduced to a predetermined frame size (predetermined frame size which is smaller than the original image). In step 124, the image data (reduced image data), for which the pixel density has been converted into the predetermined pixel density, is expanded in a region, in the image-data-for-display storage region, which region corresponds to the upper right corner of the display surface of the display 26.

Figure 4B:
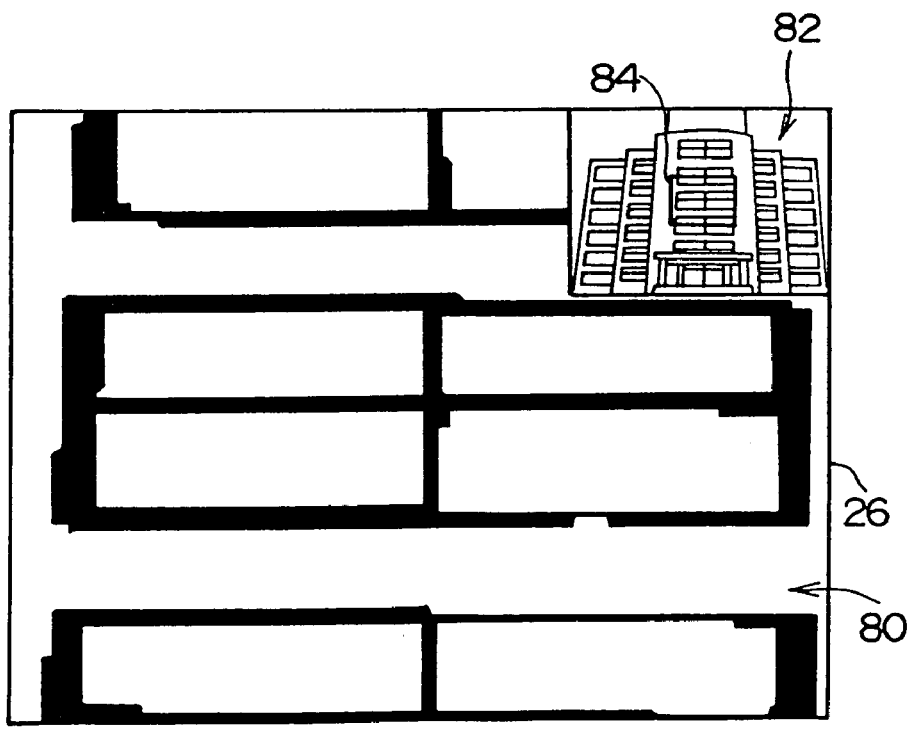
FIG. 4B is an imaginary view of an example in which an enlarged image and a navigation image which is superposed on the enlarged image are displayed on a single display.

The image data which is expanded in the image-data-for-display storage region as described above is transmitted to the display 26 in the next step 126. Therefore, as shown in FIG. 4B, an enlarged image 80 (which corresponds to a main image in the present invention) which is enlarged at a magnification which corresponds to the operation of the operation switch 32 is displayed on the entire display 26. At the same time, an image 82 (which is referred to as a navigation image 82 hereinafter), which represents the entire image and into which has been added a frame 84 which specifies the range being displayed as the enlarged image 80, is displayed in the upper right corner of the display surface at a smaller magnification which is smaller than that of the enlarged image 80.

The navigation image 82 corresponds to visible information of the present invention, and specifically to a sub-image of the present invention. A display method shown in FIG. 4B corresponds to the respective display of the main image and the sub-image on a single display, as recited in the forth aspect of the first invention.

By using the navigation image 82 displayed on the display 26 as a reference, a user can grasp the overall image, and can easily visually recognize the range being displayed as the enlarged image 80. In the image photographing mode, for example, the user can easily determine whether a range to be photographed is appropriate. In the image play back mode, for example, the user can easily confirm or appreciate detail portions of the image by making reference to the enlarged image 80 and can easily determine the range to be displayed as the enlarged image 80 by making reference to the navigation image 82.

The above-described steps 110 to 126 are repeatedly carried out while the answer to the determination in step 128 is negative and the answer to the determination in step 100 is affirmative. Accordingly, if changing the zoom magnification, switching the image display magnification, or moving the enlarged display range is designated by the user's operating the operating switch 32 again, the enlarged display range is changed, and in accordance with this change of the enlarged display range, the size of the frame 84 and the position of the frame 84 on the navigation image 82 are changed.

In the above-described embodiment, a case has been explained, in which the enlarged image 80 is continuously displayed while the image is displayed in an enlarged manner by the electronic changing magnification processing, and the navigation image 82 is superposed on the enlarged image 80 and continuously displayed in the upper right corner of the enlarged image 80. Instead of the above-described case, for example, each time a switching of the display mode is designated by operating the menu switch 28 or the operation switch 32, as shown in FIG. 5, it is possible to successively switch to a state in which only the enlarged image 80 is displayed on the display 26, a state in which only the navigation image 82 is displayed on the display 26, and a state in which the enlarged image 80 and the navigation image 82 are respectively displayed on the display 26.

Figure 6:
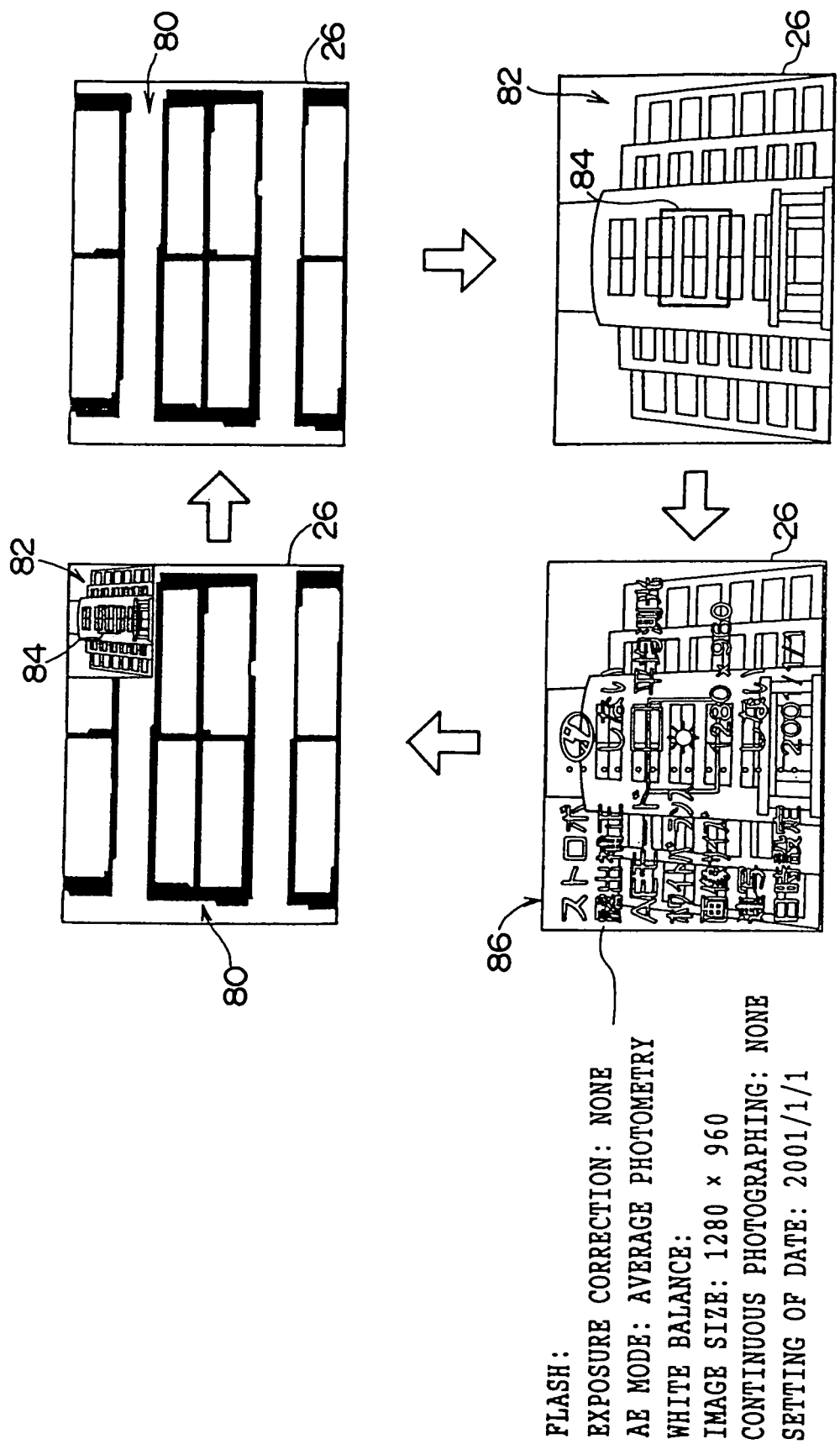
FIG. 6 is an imaginary view of another example in which the displayed image is switched in accordance with the designation for switching the display mode.

As a result, the user can easily confirm a portion of the enlarged image 80 on which the navigation image 82 is superposed in the range of the image which is displayed as the enlarged image 80, or can confirm in detail the position or the size of the enlarged display range by making reference to the navigation image 82. Each time a switching of the display mode is designated, as shown in FIG. 6, for example, it is possible to successively switch to, in addition to the above-mentioned three states, a state of displaying a set-up image 86 which enables switching of modes such as whether or not a flash is to be used, whether or not exposure correction is to be carried out, or an AE mode or the like, i.e., it is possible to successively switch to a fourth state.

Figure 7:
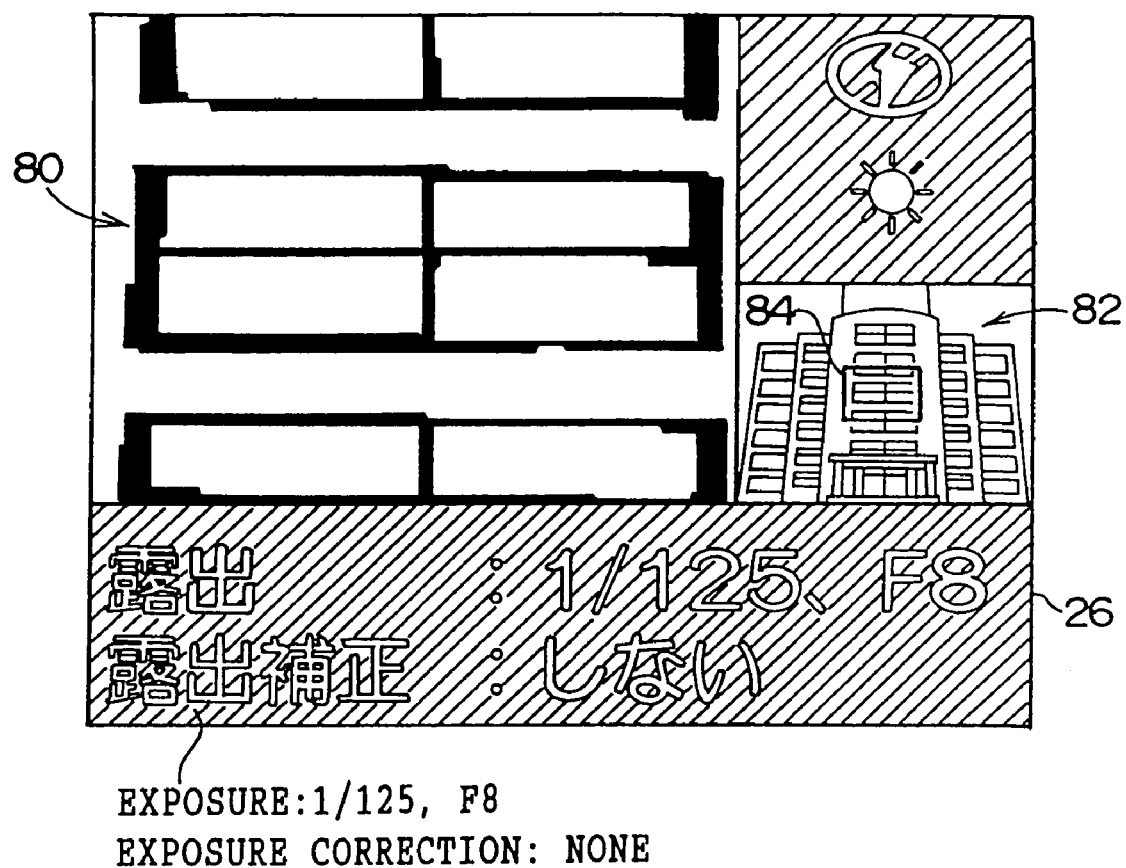
FIG. 7 is an imaginary view of an example in which an enlarged image and a navigation image are respectively displayed on a single display such that they do not overlap each other.

Instead of switching the image displayed on the display 26 in accordance with the designation for switching the display mode as described above, for example, as shown in FIG. 7, the enlarged image 80 and the navigation image 82 may be respectively displayed on a display surface of the display 26 such that they do not overlap each other. When the aspect ratio of the enlarged image 80 or the navigation image 82, is the same as that of the display surface of the display 26 or the like, a region in which no image is displayed is generated within the display surface of the display 26. Therefore, in an example shown in FIG. 7, by displaying photographing information or set-up information in the region, the display surface of the display 26 can be efficiently used.

Figure 8A:
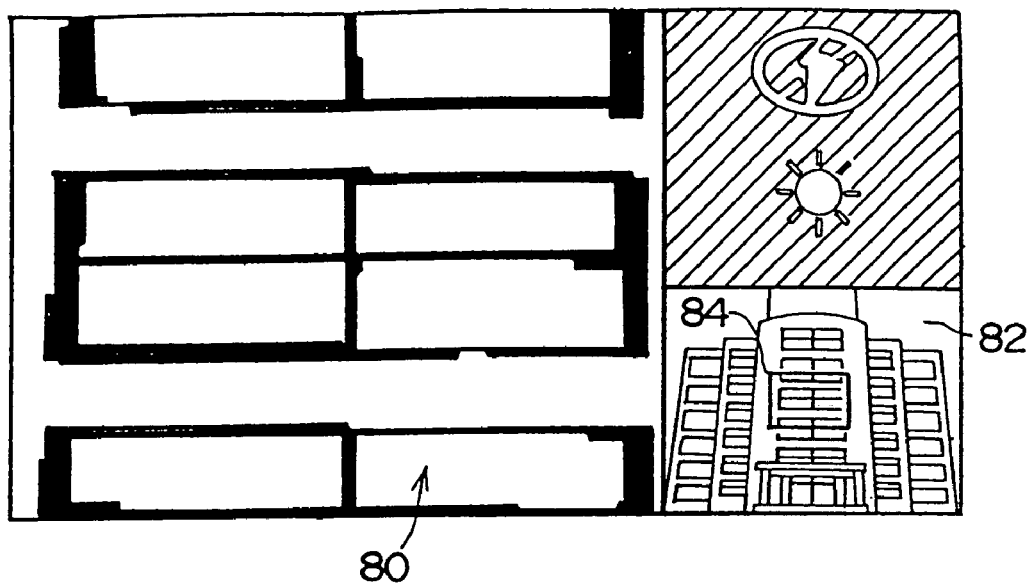
FIGS. 8A and 8B are imaginary views of an example in which an enlarged image and a navigation image are displayed such that they do not overlap each other by using a display in which an aspect ratio of a display surface is different from a displayed image.
Figure 8B:
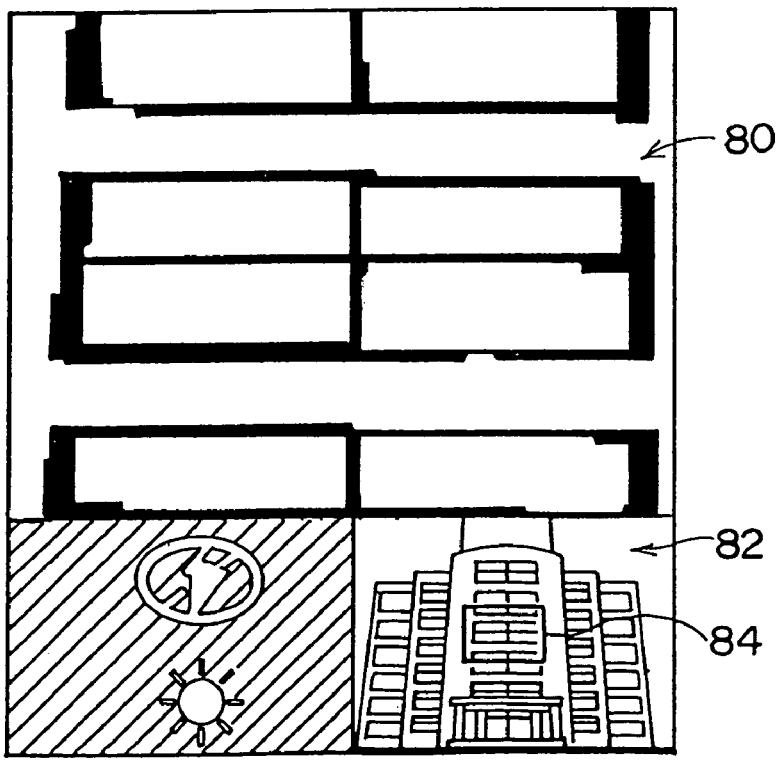

In the aspect that the enlarged image 80 and the navigation image 82 are respectively displayed such that they do not overlap each other as described above, as shown in FIGS. 8A and 8B, the aspect ratio of the display surface of the display 26 may be different from that of the enlarged image 80 or the navigation image 82. FIG. 8A shows an example in which the ratio of the horizontal length of the display surface of the display 26 to the vertical length thereof is larger than that of the displayed image. FIG. 8B shows an example in which the vertical length of the display surface of the display 26 is longer than the horizontal length thereof. As compared with the example shown in FIG. 7, a region within the display surface in which the image is not displayed can be made smaller and therefore the display surface of the display 26 can be used more efficiently.

Second Embodiment

Next, a second embodiment of the present invention will be described. The same portions as those of the first embodiment are designated by the same reference numerals, and descriptions thereof are omitted.

Figure 9A:
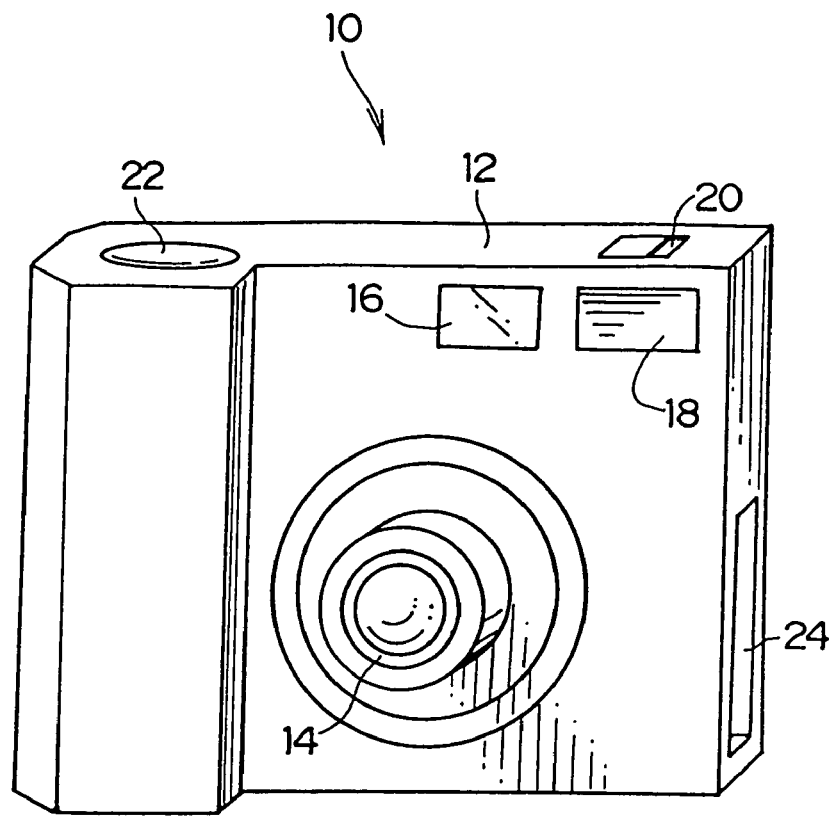
FIG. 9A is a perspective view of a digital still camera of a second embodiment, seen from the front
Figure 9B:
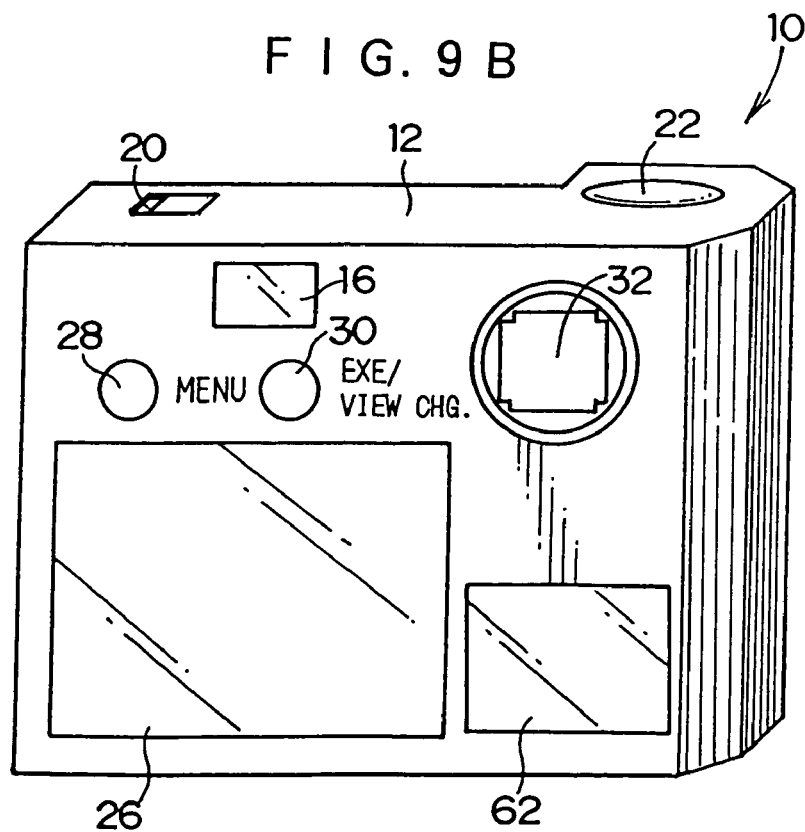
FIG. 9B is a perspective view of the digital still camera of the second embodiment, seen from the back surface.

As illustrated in FIG. 9, in a digital still camera 60 relating to the second embodiment of the present invention, a small size display 62, which is formed by a reflection type display device or a transmission type display device (for example, an LED) and is smaller than the display 26, is mounted at a right side of the display 26 on a back surface of a main body 12. Hereinafter, the display 26 is referred to as a "main display 26" and the display 62 is referred to as a "sub display 62". The sub display 62 may be a monochrome display or may be a color display. The main display 26 and the sub display 62 correspond to "a plurality of displays" recited in the forth aspect of the first invention.

Figure 10:
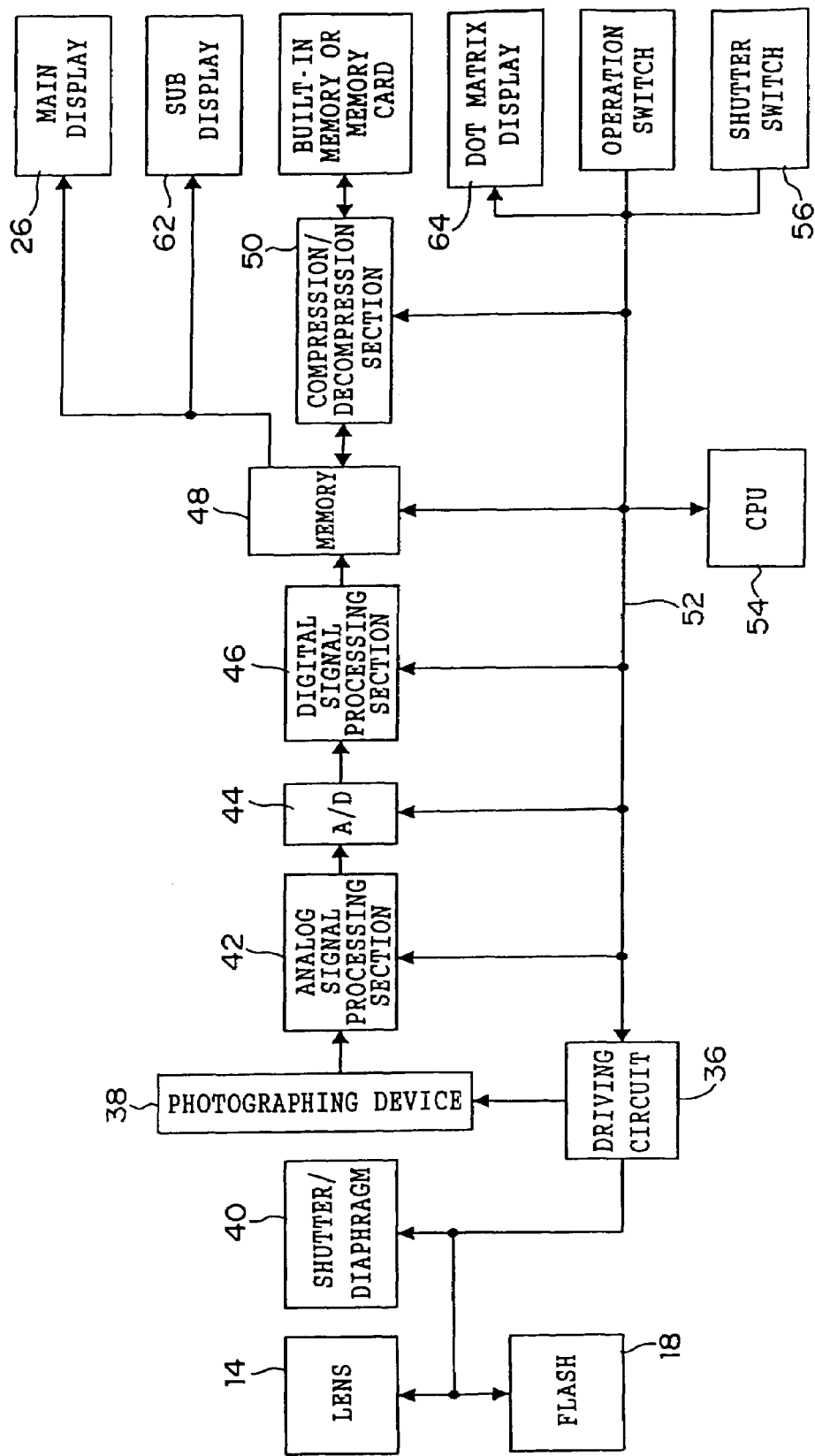
FIG. 10 is a block diagram which shows a schematic structure of an electric system of the digital still camera shown in FIGS. 9A and 9B.

As illustrated in FIG. 10, as well as the main display 26, the sub display 62 is connected to the memory 48. An image which is represented by image data which is transmitted from the memory 48 to the sub display 62 is displayed on the sub display 62. A dot matrix display 64 (not shown in FIG. 9) for displaying photographing information or set-up information is also connected to the bus 52. The dot matrix display 64 is not an essential component and can be substituted with the main display 26 or the sub display 62.

An operation of the second embodiment of the present invention will be explained. In the second embodiment, when the electronic changing magnification processing is carried out, for example, as shown in FIG. 11A, an enlarged image 80 is displayed on the entire display surface of the main display 26 and a navigation image 82 is displayed on the entire display surface of the sub display 62. Accordingly, as in the first embodiment, a user can easily grasp the overall image and can easily visually recognize a range of the image which is being displayed as the enlarged image 80. Because the enlarged image 80 and the navigation image 82 do not overlap and respective images are displayed on the displays 26 and 62 respectively, respective portions of the enlarged image 80 can be easily confirmed.

The present invention is not limited to displaying the enlarged image 80 on the main display 26 and the navigation image 82 on the sub display 62. When switching the display mode is designated, for example, as shown in FIG. 11B, the navigation image 82 may be displayed on the main display 26 and the enlarged image 80 may be displayed on the sub display 62. The user can easily confirm in detail the position or the size of the enlarged display range by making reference to the navigation image 82 which is displayed on the main display 26.

Figure 12:
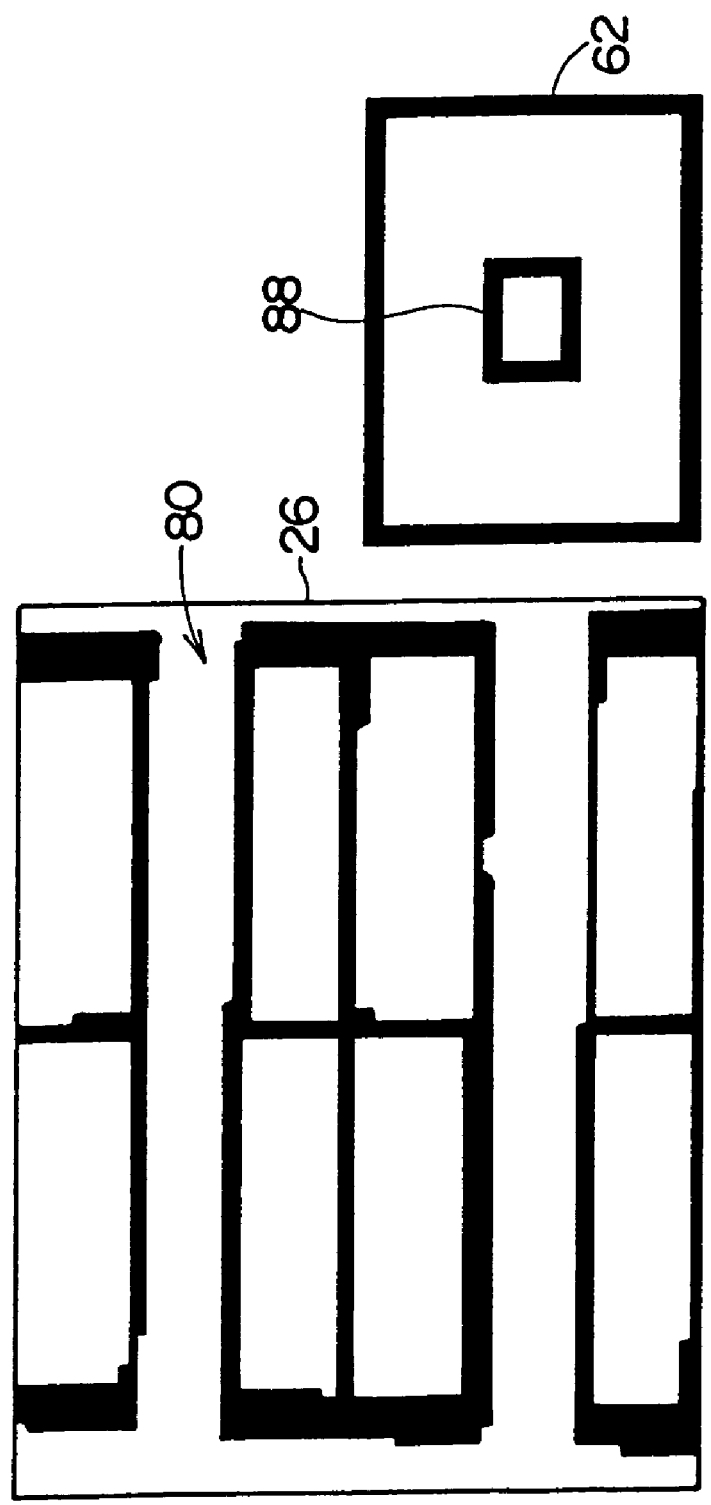
FIG. 12 is an imaginary view of an example in which a graphic form, which represents a position and a size of an enlarged display range, is displayed on a sub display.

Although there has been explained the case in which the enlarged image 80 or the navigation image 82 is displayed on the sub display 62, the present invention is not limited to this case. For example, as shown in FIG. 12, the position and the size of the enlarged display range may be simply displayed by displaying a graphic form 88 which represents the position and the size of the enlarged display range in the entire image on the sub display 62. This graphic form also corresponds to visible information in accordance with the present invention. As described above, (it is possible to use a low cost display in which the number of pixels is small and an image is difficult to be displayed with an image quality level which is at least higher than a predetermined level). Accordingly, cost reduction of a digital still camera can be realized.

Figure 13:
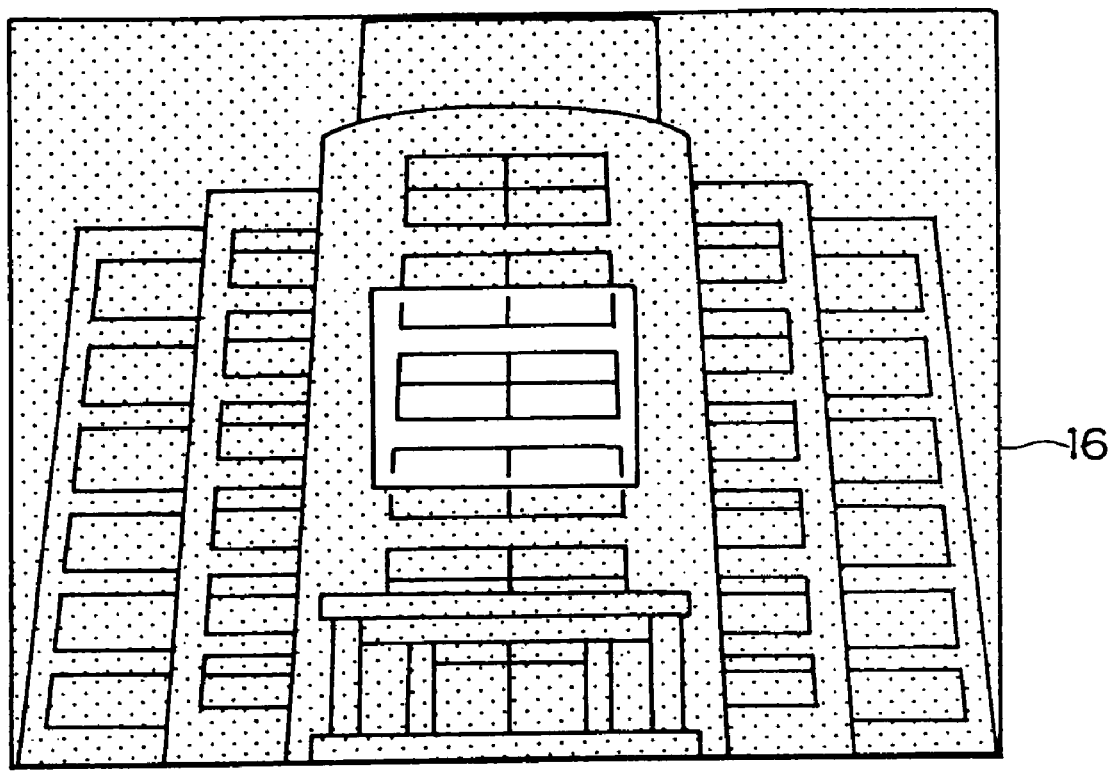
FIG. 13 is an imaginary view of an example in which a light-transmittable pattern which represents a position and a size of an enlarged display range is displayed on a liquid crystal display, which is disposed so as to superpose an optical finder.

Instead of displaying the navigation image on the display 26 or 62, or displaying the graphic form 88, the enlarged display range may be designated as follows. For example, a crystal liquid display is disposed so as to be superposed on an optical finder 16. Then, as shown in FIG. 13, among respective cells of the liquid crystal display, light transmittance of cells within the enlarged display range on the image which is visually confirmed by the user via the optical finder 16 is made different from that of cells outside the enlarged display range. A light-transmittable pattern which is displayed on the liquid crystal display also corresponds to visible information (the image recited in the second aspect of the second invention) relating to the present invention.

In this way, the image (light-transmittable pattern) which is displayed on the liquid crystal display is superposed on the image which is to be imaged by the optical finder 16. When the user looks through the optical finder 16, the user will visually confirm an image in which lightness of the inside of the enlarged display range is different from that outside of the enlarged display range, and therefore the user can easily recognize the position and the size of the enlarged display range.

Further, for example, if the size of the enlarged display range can be gradually changed with the central position thereof being fixed, instead of displaying the light-transmittable pattern on the liquid crystal display which is disposed so as to be superposed on the optical finder 16 as described above, the image which represents the enlarged display range can be displayed as follows. For example, light transmittable patterns (or graphical forms shown in FIG. 12) which correspond to various sizes of the enlarged display range are respectively recorded on a plurality of transparent sheets. Then, a sheet whose size corresponds to the current size of the enlarged display range is selectively inserted to an optical path.

FIG. 4B and the like show an example in which a boundary between the inside of the enlarged display range and the outside thereof is designated by the frame 84 which is formed by a line having high density, but the present invention is not limited to this example. The frame may be formed by a line having low density (for example, a white line) or may be formed by a line having low saturation. Instead of the frame, for example, at least one of lightness, saturation and hue of an image may be changed between the inside and the outside of the enlarged display range (for example, outside of the enlarged display range is set at low lightness or low saturation, or hue of the outside of the enlarged display range is changed to a complementary color of the original color or the like). The enlarged display range is formed in a rectangle which has a constant aspect ratio, but the present invention is not limited to this case. The aspect ratio of the enlarged display range may be optionally determined or the enlarged display range itself may be optionally changed.

Figure 14:
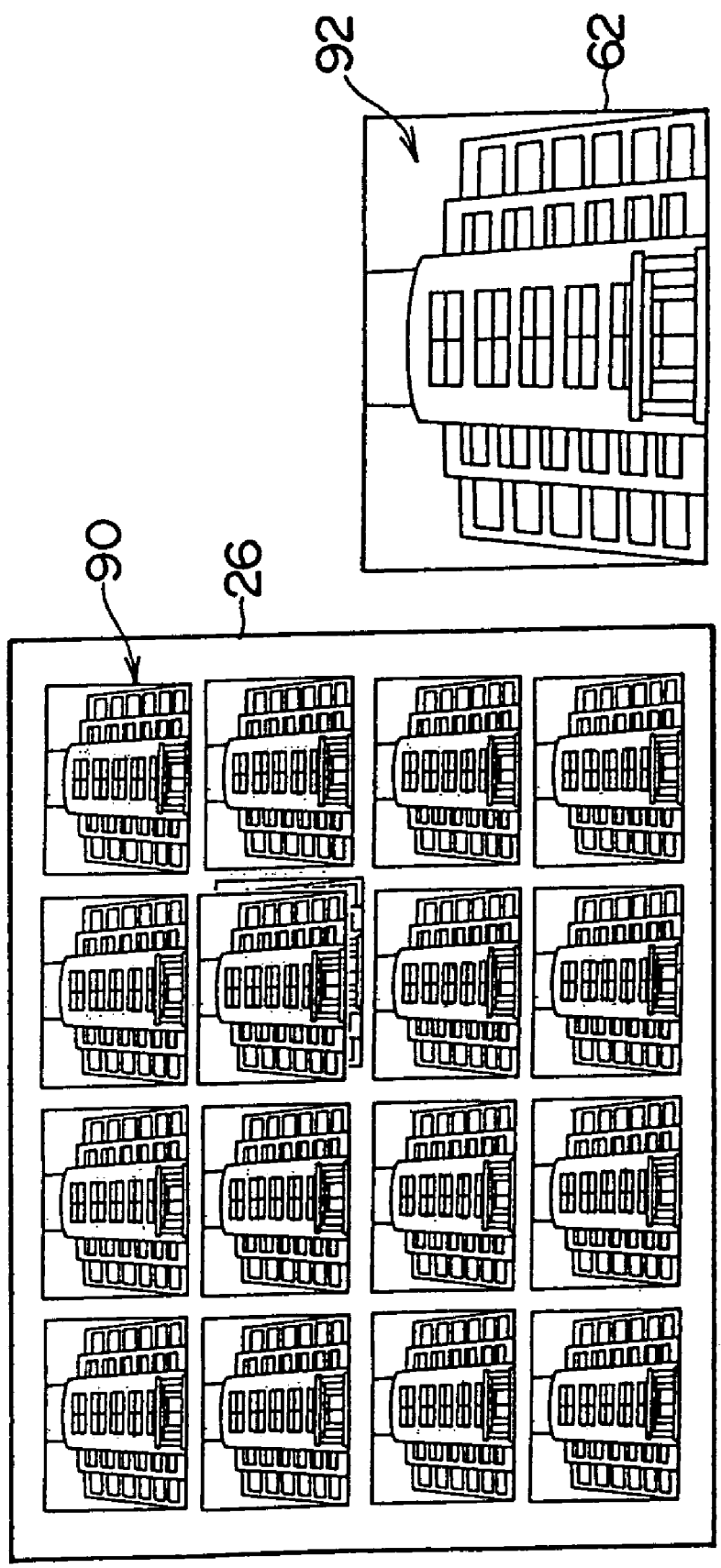
FIGS. 14A and 14B are imaginary views of an example in which, in an aspect that a plurality of displays are provided, an index image and a single image contained in the index image are respectively displayed.

Image information of the present invention is not limited to image data which represents a single image. Image data, which represents a state in which a plurality of images are arranged in a matrix (a so-called index image), may be used as image information of the present invention. For example, in the aspect in which a plurality of displays are provided as in the second embodiment, image data of the plural images which are stored in a memory card or the like is edited as image data which represents an index image and is stored in the memory 48. Then, as shown in FIGS. 14A and 14B, an index image 90 is displayed as a navigation image on the main display 26 and one image 92 of the plural images contained in the index image 90 is displayed as an enlarged image on the sub display 62. Details of respective image can be confirmed by making reference to the image displayed on the sub display 62, and therefore, a large number of images can be displayed as the index image on the main display 26. For example, images represented by a large number of image data stored in the memory card can be easily understood.

In the above-described description, a digital still camera has been explained as the image photographing apparatus recited in the first aspect or the second aspect of the second invention, but the present invention is not limited to the same. It is needless to say that a digital video camera can be applied to the present invention.

An image photographing apparatus has been explained, which has a function as the image display apparatus recited in any one of the first aspect to the sixth aspect of the first invention, but the invention recited in the first aspect to the sixth aspect of the first invention is not limited to applying to an image photographing apparatus. It is possible to use the present invention as an image display apparatus which reads out image data which is stored in an information storage medium such as a memory card, a CD-R, or the like and displays the image data on a display device such as a display or the like.

Figure 15:
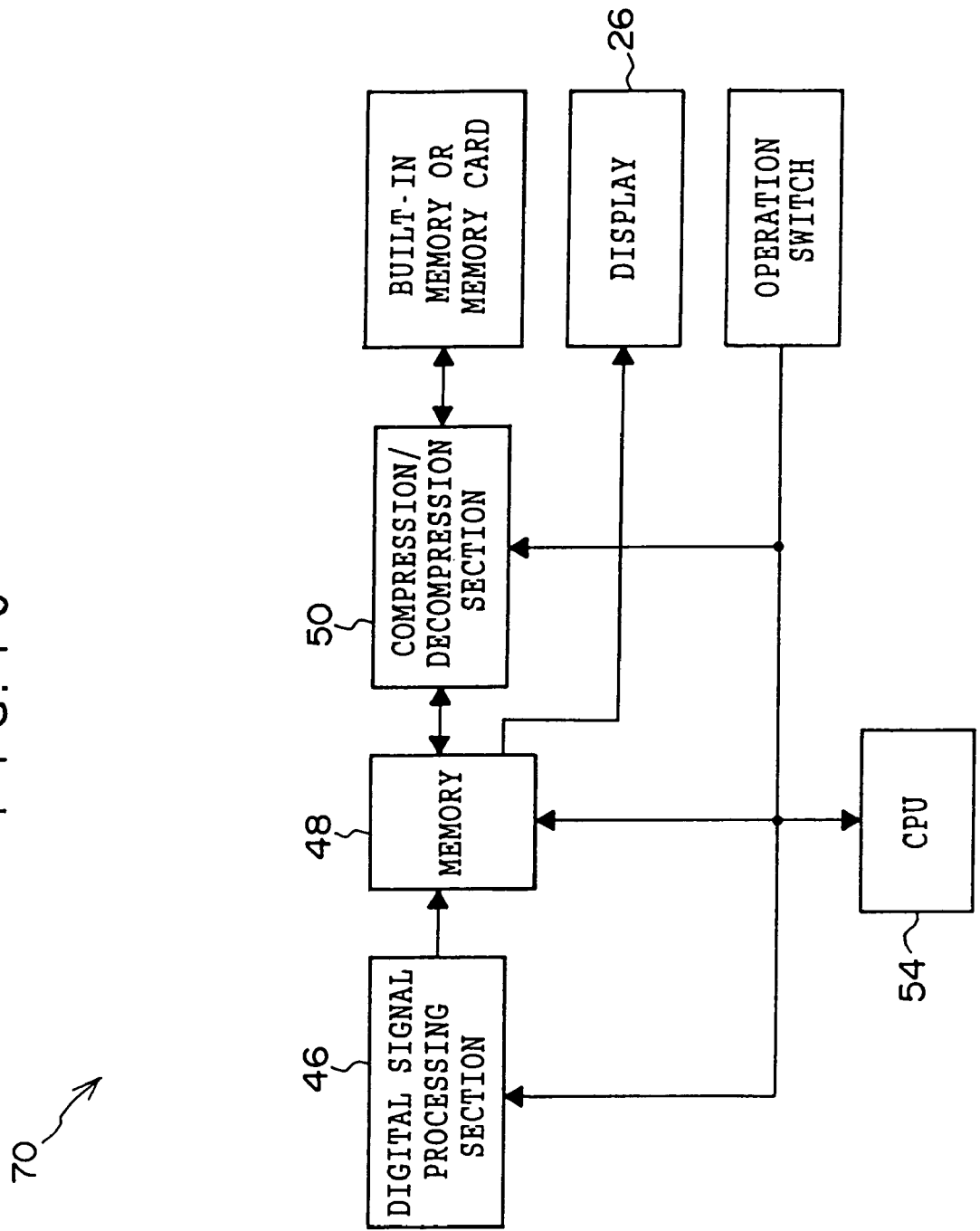
FIG. 15 is a block diagram of an example of a schematic structure of an image display apparatus.
Figure 16:
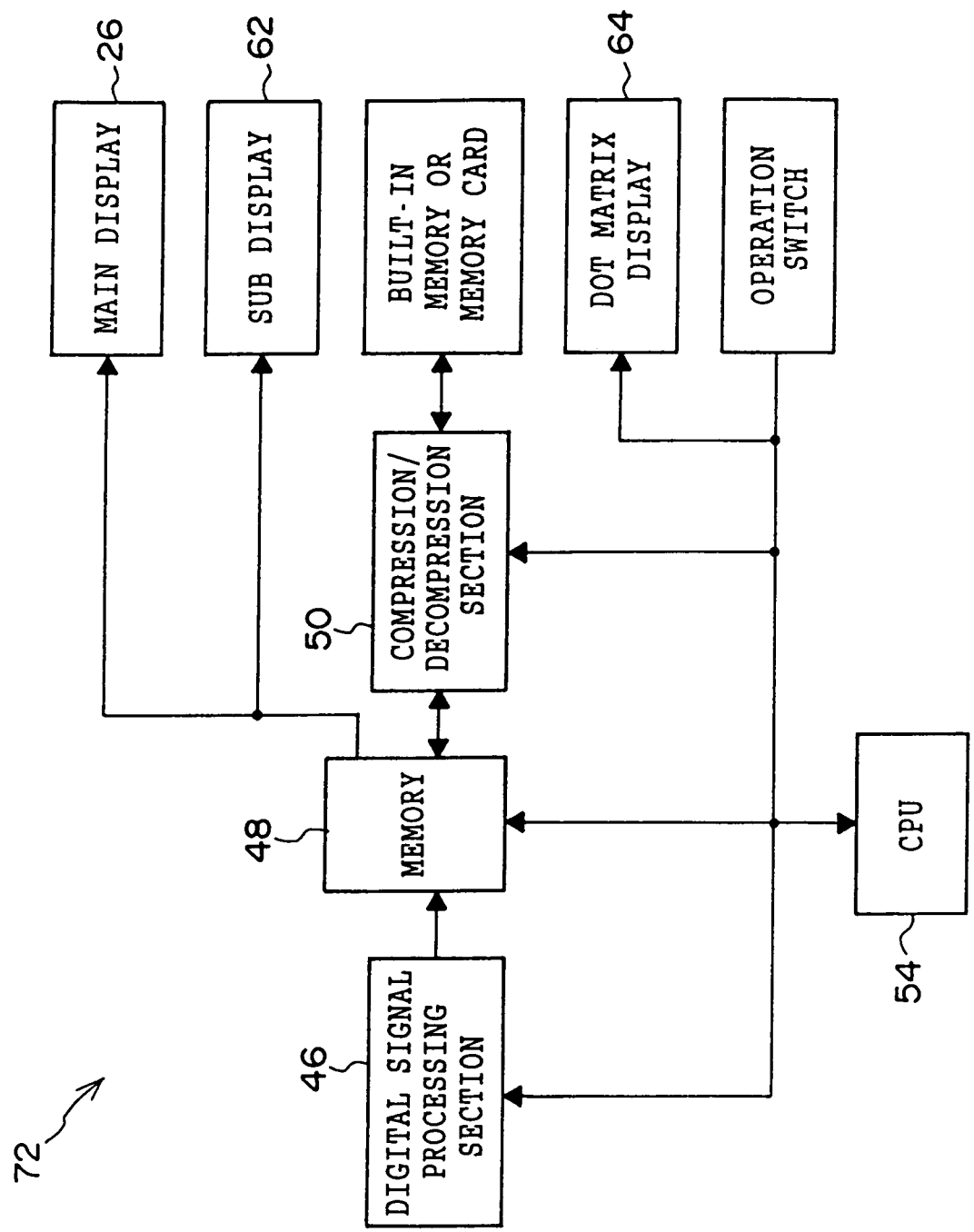
FIG. 16 is a block diagram of another example of a schematic structure of an image display apparatus.

For example, FIG. 15 shows a schematic block diagram of an image display apparatus 70 in which a single display 26 is provided as in the digital still camera shown in FIGS. 1 and 2. FIG. 16 shows a schematic block diagram of an image display apparatus 72 in which a main display 26 and a sub display 62 are provided as in the digital still camera 60 shown in FIGS. 9 and 10. When the present invention recited in any one of the first aspect to the sixth aspect of the first invention is applied to these image display apparatuses and the image is displayed in an enlarged manner by the electronic changing magnification processing, visible information relating to the present invention (navigation image, graphic form or image which represents the enlarged display range) may be displayed.

Although embodiments of the present invention have been explained, the above embodiments include aspects described below.

(1) An image display apparatus according to the first aspect of the first invention, wherein an image represented by image information is an index image in which a plurality of images are arranged in a matrix, and a display controller displays one of the plurality of images contained in the index image as a main image.

(2) An image display apparatus according to the sixth aspect of the first invention, wherein image information obtained by photographing with the image photographing apparatus is stored in an information storage medium.

What is claimed is:
1. An image display apparatus, comprising:
 (a) a memory device having circuitry disposed therein for electronic storage and retrieval of information;
 (b) a display device having a display panel and circuitry for electronically displaying information on the display panel, the display panel having a size appropriate for incorporation with a portable camera; and
 (c) a display control device electronically connected to the memory device and the display device, the display control device having electronic program logic, which when information is stored in the memory device representing an image, is operable for causing the display control device to retrieve the stored information and display a portion of the image represented by the stored information as a main image on the display panel and range information indicating the portion of the image displayed in relation to the entire image represented by the stored information, wherein
 both the main image and the entire image are obtained with a single CCD of the portable camera,
 the entire image is superimposed on the main image display,
 both the main image and the entire image are displayed in an area contained within the display panel, and
 no portion of the entire image is hidden when the entire image is superimposed on the main image display.

2. The image display apparatus of claim 1, wherein the stored information in said memory device is image information outputted from a photography device, wherein the photography device produces the image information from optical information.

3. The image display apparatus of claim 1, wherein the stored information in said memory device is image information acquired by communication with another device.

4. The image display apparatus of claim 3, wherein said electronic program logic is for displaying said main image and said range information together on said display panel, and if not together, then separately, wherein the image display apparatus includes another display device having another display panel and circuitry, with the main image displayed on the display panel, and the range information displayed on the another display panel.

5. The image display apparatus of claim 1, wherein said display device comprises a transmission type dot matrix display.

6. The image display apparatus of claim 1, wherein said range information comprises a sub-image on the display panel of the entire image, superposed over a section of the main image.

7. The image display apparatus of claim 6, wherein said display control device displays a border around the sub-image, as a boundary separating the sub-image from the main image.

8. The image display apparatus of claim 6, wherein said display control device displays the sub-image as having at least one of saturation, lightness, and hue range, different from that of the main image.

9. The image display apparatus of claim 1, further comprising a designation device electronically connected to said display control device, the designation device being for selecting at least one of a position designating the portion of the image to be displayed, and a magnification size, wherein said electronic program logic determines the range information in accordance with a selection inputted via said designation device.

10. The image display apparatus of claim 1, wherein said stored information was read from an information storage medium and stored in said memory device.

11. The image display apparatus of claim 1, wherein the image represented by said stored information is an index image in which a plurality of images are arranged in matrix format, and said electronic program logic displays as said main image, any one image of the plurality of images.

12. The image display apparatus according to claim 1, further comprising a designation device functionally coupled to the display control device, for controlling what portion of the image is displayed.

13. The image display apparatus according to claim 12, wherein the controlling includes specifying the magnification of the displayed image.

14. The image display apparatus according to claim 12, wherein the controlling includes specifying the portion of the image to the displayed.

15. The apparatus according to claim 1, wherein the display control device causes the display to successively switch states, wherein the states include one of displaying only the portion of the image on the display, displaying only the entire image on the display, and simultaneously displaying both the portion of the image and the entire image on the display.

16. The apparatus according to claim 1, wherein the display control device causes the display to switch to a state displaying a set up image enabling the alteration of at least one of image acquisition parameters and device control parameters.

17. An apparatus for photographic imagery, the apparatus comprising:
(a) a portable photography device operable to acquire an optical image and produce electronic image information representative of the optical image; and
(b) an image display device electronically connected and directly attached to the portable photography device, the image display device including:
(i) a memory device having circuitry disposed therein for electronic storage and retrieval of information;
(ii) a display device having a display panel and circuitry for electronically displaying information on the display panel, the display panel having a size appropriate for incorporation with the portable photography device; and
(iii) a display control device electronically connected to the memory device and the display device, the display control device having electronic program logic, which when information is stored in the memory device representing an image, is operable for causing the display control device to retrieve the stored information and display a portion of the image represented by the stored information as a main image on the display panel and range information indicating the portion of the image displayed in relation to the entire image represented by the stored information, wherein
both the main image and the entire image are displayed in an area contained within the display panel,
both the main image and the entire image are reproduced using the optical image acquired with a single CCD of the portable photography device,
said stored information is data selected from the group consisting of electronic image information outputted from said portable photography device and image information read from an information storage medium, and
the display control device provides a mode wherein image acquisition parameters are simultaneously displayed with the image, the image acquisition parameters are parameters used by the portable photography device to acquire the optical image.

18. The apparatus of claim 17, further comprising an optical finder for viewing the optical image for conversion by said portable photography device to electronic image information representative of the optical image, wherein the display device includes another display panel and when the stored information has been outputted from the portable photography device into the memory device, the electronic program logic displays the main image the entire image represented by the stored information, and a portion of said entire image, said another display panel with the range information being indicated as a differential portion of the main image.

19. The apparatus according to claim 17, wherein the entire image is superimposed on the main image.

20. The apparatus according to claim 19, wherein the display control device causes the display to successively switch states, wherein the states include one of displaying only the portion of the image on the display, displaying only the entire image on the display, and simultaneously displaying both the portion of the image and the entire image on the display.

21. The apparatus according to claim 19, wherein the display control device causes the display to switch to a state displaying a set up image enabling the alteration of at least one of image acquisition parameters and device control parameters.

22. The apparatus according to claim 17, wherein the portion of the image and the entire image are simultaneously displayed in a non-overlapping manner, and in a region of the display wherein no image is displayed, information regarding image acquisition or control parameters is displayed.

23. An image display method for an image display apparatus including a memory device having information stored therein representing an image, and a display device for displaying the image, the method comprising:
(a) displaying a portion of the image represented by the information stored in the memory device as a main image on the display device, wherein the display device has a size appropriate for incorporation with a portable camera; and
(b) displaying range information indicating the portion of the image displayed in relation to the entire image represented by the stored information, wherein
both the main image and the entire image are reproduced using one optical image acquired with a single CCD of the portable camera,
the entire image is superimposed on the main image,
both the main image and the entire image are displayed in an area contained within the display device, and
no portion of the entire image is hidden when the entire image is superimposed on the main image display.

24. The image display method of claim 23, wherein the display device comprises a transmission type dot matrix display.

25. The image display method of claim 23, wherein the step of displaying range information includes displaying the range information as a sub-image, which is smaller than the main image, wherein the sub-image displays the entire image that the stored information represents, sized to fit within the sub-image.

26. The image display method of claim 25, wherein if the image display apparatus comprises a second display device, the step of displaying range information includes displaying the main image on one display device and the sub-image on the other display device, and if the image display apparatus includes a single display device, displaying the sub-image superposed over a section of the main image on the single display device.

27. The image display method of claim 23, further comprising:
(a) selecting via a designation device, at least one of a position designating the portion of the image to be displayed, and a magnification size; and
(b) determining the range information in accordance with a selection entered via the designation device.

28. The image display method of claim 23, further comprising:
displaying an image represented by image information read from an information storage medium and stored in said memory device.

29. The method according to claim 23, further comprising successively switching display states, wherein the display states include one of displaying only the portion of the image on the display, displaying only the entire image on the display, and simultaneously displaying both the portion of the image and the entire image on the display.

30. The method according to claim 23, further comprising switching to a state displaying a set up image enabling the alteration of at least one of image acquisition parameters and device control parameters.

31. An image display method for a portable image photographic apparatus having a photography device operable to acquire an optical image and convert the optical image to image information, and an image display apparatus having a memory device which stores the image information and a display panel for displaying an image, comprising:
(a) displaying a portion of the image represented by information stored in said memory device as a main image on the display panel, wherein the display panel is directly attached to the portable image photographic apparatus;
(b) displaying range information indicating the portion of the image displayed in relation to an entire image represented by the stored information, wherein both the main image and the entire image are obtained with the optical image acquired with a single CCD of the photography device, both the main image and the entire image are displayed in an area contained within the display device, and further wherein the display control device provides a mode wherein image acquisition parameters are simultaneously displayed with the image, the image acquisition parameters are parameters used by the photography device to acquire the optical image; and
(c) displaying on the display panel, an image represented by image information stored in said memory device, wherein the stored image information is information read from an information storage medium, or information outputted from said photography device.

32. The image display method of claim 31, wherein said image photographic apparatus includes an optical finder for viewing an optical image for conversion by said photography device, and the step of displaying range information includes displaying the range information as a sub-image superposed on the image which is being viewed via said optical finder, when said portion of the image is being displayed as the main image on the display panel, from the image information stored in said memory device from said photographic device.

33. The method according to claim 31, wherein the entire image is superimposed on the main image.

34. The method according to claim 33, further comprising successively switching display states, wherein the display states include one of displaying only the portion of the image on the display, displaying only the entire image on the display, and simultaneously displaying bot the portion of the image and the entire image on the display.

35. The method according to claim 33 further comprising switching to a state displaying a set up image enabling the alteration of at least one of image acquisition parameters and device control parameters.

36. The method according to claim 31, wherein the portion of the image and the entire image are simultaneously displayed in a non-overlapping manner, and in a region of the display wherein no image is displayed, information regarding image acquisition or control parameters is displayed.

* * * * *